(12) United States Patent
Bastiaens et al.

(10) Patent No.: US 8,257,613 B2
(45) Date of Patent: Sep. 4, 2012

(54) FILLED COMPOSITIONS AND A METHOD OF MAKING

(75) Inventors: Jos Bastiaens, Berendrecht (BE); Arno Hagenaars, Bergen op Zoom (NL); Jan Matthijssen, Moerstraten (NL)

(73) Assignee: Sabic Innovative Plastics IP B.V. (NL)

( * ) Notice: Subject to any disclaimer, the term of this patent is extended or adjusted under 35 U.S.C. 154(b) by 104 days.

(21) Appl. No.: 12/272,197

(22) Filed: Nov. 17, 2008

(65) Prior Publication Data

US 2009/0256119 A1 Oct. 15, 2009

Related U.S. Application Data

(60) Provisional application No. 61/043,594, filed on Apr. 9, 2008.

(51) Int. Cl.
*H01B 1/00* (2006.01)

(52) U.S. Cl. ........ 252/500; 252/511; 252/512; 252/513; 524/145; 524/153; 524/423; 524/445; 524/449

(58) Field of Classification Search .................. 252/500, 252/511, 512, 513; 524/153, 445, 145, 423, 524/449
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 9/1938 | Hume Carothers | |
| 2,312,966 A | 3/1943 | Hanford | |
| 2,512,606 A | 6/1950 | Bolton et al. | |
| 3,379,792 A | 4/1968 | Finholt | |
| 4,315,086 A | 2/1982 | Ueno et al. | |
| 4,565,684 A | 1/1986 | Tibbetts et al. | |
| 4,572,813 A | 2/1986 | Arakawa | |
| 4,600,741 A | 7/1986 | Aycock et al. | |
| 4,656,684 A | 4/1987 | Jewett | |
| 4,659,760 A | 4/1987 | Van der Meer | |
| 4,663,230 A | 5/1987 | Tennent | |
| 4,732,938 A | 3/1988 | Grant et al. | |
| 4,816,289 A | 3/1989 | Komatsu et al. | |
| 4,873,276 A * | 10/1989 | Fujii et al. ...................... | 524/153 |
| 4,876,078 A | 10/1989 | Arakawa et al. | |
| 4,970,272 A | 11/1990 | Gallucci | |
| 5,001,181 A | 3/1991 | Takagi et al. | |
| 5,024,818 A | 6/1991 | Tibbetts et al. | |
| 5,071,894 A | 12/1991 | Weil et al. | |
| 5,124,391 A | 6/1992 | Muehlbach et al. | |
| 5,132,365 A | 7/1992 | Gallucci | |
| 5,165,909 A | 11/1992 | Tennent et al. | |
| 5,371,132 A | 12/1994 | Ebara et al. | |
| 5,475,049 A * | 12/1995 | Ohtomo et al. ............... | 524/449 |
| 5,589,152 A | 12/1996 | Tennent et al. | |
| 5,591,382 A | 1/1997 | Nahass et al. | |
| 5,965,655 A | 10/1999 | Mordecai et al. | |
| 6,084,012 A | 7/2000 | Gareiss et al. | |
| 6,469,093 B1 | 10/2002 | Koevoets et al. | |
| 6,476,105 B2 | 11/2002 | Jeong et al. | |
| 6,593,411 B2 | 7/2003 | Koevoets et al. | |
| 2003/0166762 A1 | 9/2003 | Koevoets et al. | |
| 2004/0102560 A1* | 5/2004 | Nozaki ........................ | 524/445 |
| 2006/0122310 A1 | 6/2006 | Matthijssen | |
| 2006/0199903 A1 | 9/2006 | Miyoshi et al. | |
| 2007/0123625 A1* | 5/2007 | Dorade et al. ................ | 524/423 |

FOREIGN PATENT DOCUMENTS

| | | |
|---|---|---|
| CN | 1806010 A | 7/2006 |
| EP | 0543462 | 5/1993 |
| EP | 0562178 | 9/1993 |
| EP | 1736512 A | 12/2006 |
| JP | 05-247388 | * 9/1993 |
| JP | 2006-199748 | * 8/2006 |
| JP | 2006-299055 | * 11/2006 |
| WO | 9945069 A1 | 9/1999 |

OTHER PUBLICATIONS

Japanese Publication No. 2000230124, published Aug. 22, 2000, Abstract Only, 1 page.
Japanese Publication No. 2004143239, published May 20, 2004, Abstract Only, 1 page.
WO2004092275, published Oct. 28, 2004, Abstract Only, 1 page.
WO9945069, published Sep. 10, 1999, Abstract Only, 1 page.
Japanese Publication No. 2004107488, published Apr. 8, 2004, Abstract Only, 1 page.
Anonymous, "High Performance Filler" [Online] Oct. 2007, pp. 1-10, XP002531943, Retrieved from the Internet: URL: http://www.feldspat.com/home/repositoryVertrieb/Kunststoffe/Duroplaste%20final_0.pdf> [retrieved on Jun. 12, 2009] p. 3, Tremin 283, L/D ratio.
Anonymous, "Product data: Tremin 283 Wollastonite" [Online] Sep. 2003, pp. 1-2, XP002531942 Retrieved from the Internet: URL:http://www.quarz.de/home/repository/Stoffdatenb1%C3%A4tter/deutsch/TREMIN-283.pdf> [retrieved on Jun. 12, 2009] p. 1, table, medium grain size.
International Search Report for International Application No. PCT/IB2009/051377, mailed Jun. 30, 2009, 7 pages.
Written Opinion for for International Application No. PCT/IB2009/051377, mailed Jun. 30, 2009, 11 pages.
Chinese Patent No. 1806010 (A); Publication Date: Jul. 19, 2006; Abstract Only; 1 Page.
International Publication No. 9945069 (A1); Publication Date: Oct. 19, 1999; Abstract Only; 2 Pages.

* cited by examiner

*Primary Examiner* — Khanh Tuan Nguyen
(74) *Attorney, Agent, or Firm* — Cantor Colburn LLP

(57) ABSTRACT

A composition comprises a poly(arylene ether), a polyamide, electrically conductive filler, an impact modifier, and wollastonite wherein the wollastonite particles have an average length to diameter ratio less than or equal to 5 and a median particle size of 2 to 5 micrometers. Methods of making the composition are also described.

19 Claims, No Drawings

FILLED COMPOSITIONS AND A METHOD OF MAKING

CROSS REFERENCE TO RELATED APPLICATIONS

This application claims the benefit of U.S. Provisional Patent Application No. 61/043,594 filed on Apr. 9, 2008 and which is incorporated by reference herein in its entirety.

BACKGROUND OF THE INVENTION

The disclosure relates to poly(arylene ether)/polyamide compositions containing mineral fillers, and a method of making these compositions.

Poly(arylene ether)-polyamide blends have established themselves as highly attractive materials from which an extremely diverse range of products can be molded. The blends exhibit the most desirable properties of each material, i.e., outstanding heat resistance and dimensional stability from the poly(arylene ether), and excellent strength and chemical resistance from the polyamide. Exemplary disclosures of such compositions are found in U.S. Pat. No. 6,469,093 (Koevoets et al); U.S. Pat. No. 4,873,276 (Fujii et al); U.S. Pat. No. 4,659,760 (Van der Meer), U.S. Pat. No. 4,732,938 (Grant et al), and U.S. Pat. No. 4,315,086 (Ueno et al).

The properties of the poly(arylene ether)-polyamide blends are often enhanced by the addition of compatibilizing agents for the base resins; flow modifiers, impact modifiers, and fillers. The blends are very popular for use in molding a variety of automobile parts, e.g., body panels, trunk lids, hoods, and many smaller components, such as fuel filler doors and mirror housings. Replacement of metal automobile components with plastic parts has many advantages, such as weight reduction and the elimination of corrosion problems. However, in many automotive applications, the plastic component must appear identical to adjacent metal components, in terms of color, texture, and overall appearance.

An electrostatic painting operation is often used to apply paint to plastic and metal components in automotive assembly operations. Since such a painting operation requires that the plastic be sufficiently conductive, conductivity additives must be incorporated into the plastic. Moreover, since the paint is usually baked onto the panel at elevated temperatures (e.g., greater than 180° C.), the plastic component must be able to withstand such temperatures, without degradation or warpage.

Many types of poly(arylene ether)-polyamide blends have the heat resistance needed for the painting and baking operations. Moreover, the blends have been adequately formulated to provide the necessary conductivity for electrostatic-painting, although the required additives can be expensive and difficult to handle. Their presence can also adversely affect other properties, such as ductility and surface appearance.

Technologists have become very skilled in formulating poly(arylene ether)-polyamide blends which balance a number of required properties. However problems can still occur for a variety of end use applications and manufacturing conditions. For example, it can be very difficult to ensure that a molded part has the low coefficient of thermal expansion (CTE) required in many instances. In the case of fuel filler doors and other parts which may be closely positioned between metal components, a low CTE is often critical for preventing expansion and "sticking" of the parts. These close tolerances can be very difficult to consistently maintain when the automobile is repeatedly exposed to sunlight and high outdoor temperatures during use.

Moreover, both consumers and dealers of automobiles (as well as manufacturers) place a great emphasis on the overall, painted appearance of a car or truck. A molded, painted plastic part often must have a "Class A" surface, or an appearance approaching Class A quality. As noted in U.S. Pat. No. 5,965,655 (Mordecai et al), there are various definitions of "Class A". In general, a Class A surface as used herein is meant to describe a painted plastic surface which is substantially identical to an adjacent sheet-metal surface, in terms of texture (i.e., smoothness) and color. Furthermore, the surface should be generally free of various defects, such as splay and paint popping.

Some of the commercially-available poly(arylene ether)-polyamide compositions for electrostatic-painted applications employ talcum (talc) as a filler. While these products usually exhibit a good balance of dimensional stability, rigidity, heat resistance, and impact strength, they may exhibit some drawbacks under certain conditions. For example, when the compositions are molded, the presence of talc can lead to splay. Splay is often manifested as streaking or pale marks on the molded article—usually near the mold gate. Moreover, when the articles are painted, other surface defects sometimes occur, such as paint popping. These problems seem to be more prevalent when talcum is present along with the conductivity additive.

The undesirable surface defects can sometimes be minimized or eliminated by careful adjustment and maintenance of molding conditions, such as temperature and cycle time. However, the processing window can be very narrow, i.e., small deviations from the pre-set molding conditions bring on the occurrence of the defects. This narrow processing window is a considerable disadvantage in an industrial setting, leading to losses in processing time and efficiency.

Organic clays such as kaolin have been proposed as an alternative to talc and has been shown to have good surface properties after painting. However, currently available compositions comprising organic clays do not have the mechanical properties required for some applications. In particular there is a desire for compositions having a lower coefficient of thermal expansion (CTE).

Despite numerous attempts to produce compositions having a combination of mechanical properties and surface appearance there remains an ongoing need for compositions having improved impact strength and surface appearance as well as methods of making these compositions.

BRIEF DESCRIPTION OF THE INVENTION

Disclosed herein are compositions and methods for making the same, as well as articles made from the compositions. In one embodiment, a composition comprises a poly(arylene ether), a polyamide, electrically conductive filler, an impact modifier, and wollastonite wherein the wollastonite particles have a median particle size of 2 to 5 micrometers and an average length to diameter ratio (L:D) less than or equal to 5. Methods of making the composition are also described herein.

DETAILED DESCRIPTION OF THE INVENTION

Wollastonite particles typically have an acicular (needle-like) shape. As a result it would reasonably be expected that compositions comprising wollastonite as a filler would have physical property profiles similar to those compositions comprising fibrous fillers. Despite this expectation it has been found that compositions comprising poly(arylene ether), polyamide and wollastonite have a desirable combination of physical properties not seen with fibrous filler such as fiberglass or with lamellar fillers such as talc or kaolin. The unique combination of properties is achieved when the wollastonite has a median particle size of 2 to 5 micrometers and an average length to diameter ratio (L:D) that is less than or equal to 5. The compositions described herein have good surface appearance, minimal warpage, low coefficient of thermal expansion, acceptable impact strength and acceptable elongation at break.

Surprisingly compositions comprising a wollastonite having a median particle size of 2 to 5 micrometers and an average length to diameter ratio less than or equal to 5 have a coefficient of thermal expansion in the flow direction that is 85 to 100%, or, more specifically, 90 to 100% of the coefficient of thermal expansion in the crossflow direction. Additionally the coefficient of thermal expansion in the flow direction is less than or equal to 100 micrometers/meter/° C. In contrast compositions having fibrous fillers typically have a coefficient of thermal expansion in the flow direction which differs substantially from the coefficient of thermal expansion in the crossflow direction. In some cases the coefficient of thermal expansion in the flow direction for compositions having fibrous fillers can be less than or equal to 70% of the coefficient of thermal expansion in the crossflow direction. Similarly, compositions comprising wollastonite with a length to diameter ratio of greater than 5 can have a coefficient of thermal expansion in the flow direction that is less than or equal to 80% of the coefficient of thermal expansion in the crossflow direction.

In some embodiments the composition has a Notched Izod impact strength of 6 to 20 kilojoules per square meter ($kJ/m^2$). Within this range the Notched Izod impact strength can be greater than or equal to 10 $kJ/m^2$, or, more specifically, greater than or equal to 12 $kJ/m^2$, or, more specifically, greater than or equal to 14 $kJ/m^2$. In some embodiments the Notched Izod is less than or equal to 18 $kJ/m^2$. Notched Izod impact strength is determined as described in the examples.

In some embodiments the composition has an elongation at break of 5 to 35%. Within this range the elongation at break can be greater than or equal to 10%, or, more specifically, greater than or equal to 15%. Also within this range the elongation at break can be less than or equal to 30%, or, more specifically, less than or equal to 20%. Elongation at break is determined as described in the examples.

As mentioned above the composition has a coefficient of thermal expansion in the flow direction less than or equal to 100 micrometers/meter/° C. Within this range the coefficient of thermal expansion in the flow direction can be less than or equal to 90 micrometers/meter/° C., or, more specifically, less than or equal to 80 micrometers/meter/° C. Additionally the coefficient of thermal expansion in the flow direction can be greater than or equal to 60 micrometers/meter/° C.

Specific volume resistivity (SVR) is defined as the electrical resistance through a one-centimeter cube of material and is expressed in ohm-cm. The lower the specific volume resistivity of a material, the more conductive the material is. In some embodiments the composition has a specific volume resistivity less than or equal to $10^{12}$ ohm-cm. In some embodiments the composition has a specific volume resistivity less than or equal to $10^6$ ohm-cm, or, more specifically, less than or equal to $10^5$ ohm-cm, or, even more specifically, less than or equal to $10^4$ ohm-cm. In some embodiments the composition has a specific volume resistivity greater than or equal to 10 ohm-cm, or, more specifically, greater than or equal to $10^2$ ohm-cm, or, even more specifically, greater than or equal to $10^3$ ohm-cm.

Specific volume resistivity is determined as follows. A tensile bar is molded according to ISO 3167. A sharp, shallow cut is made near each end of the narrow central portion of the bar. The bar is fractured in a brittle fashion at each cut to separate the narrow central portion, now having fractured ends with dimensions of 10 millimeters (mm)×4 mm. If necessary to obtain fracturing in a brittle fashion, the tensile bar is first cooled, for example, in dry ice or liquid nitrogen in a −40° C. freezer. The length of the bar between the fractured ends is measured. The fractured ends of the sample are painted with conductive silver paint, and the paint is allowed to dry. Using a multi-meter such as a Fluke 187, True RMS Multimeter in resistance mode, electrodes are attached to each of the painted surfaces, and the resistance is measured at an applied voltage of 500 millivolts to 1000 millivolts. Values of the specific volume resistivity are obtained by multiplying the measured resistance by the fracture area of one side of the bar and dividing by the length:

$$\rho = R \times A / L$$

where $\rho$ is the specific volume resistivity in ohm-cm, R is the measured resistance in Ohms, A is the fractured area in square centimeters ($cm^2$), and L is the sample length in centimeters (cm). The specific volume resistivity values have units of Ohm·cm.

The mechanical properties described above may be combined in any combination. Explicitly contemplated combinations are as follows. In some embodiments, the composition has a combination of a coefficient of thermal expansion in the flow direction as described above and specific volume resistivity as described above. In some embodiments, the composition has a combination of a coefficient of thermal expansion in the flow direction, specific volume resistivity and Notched Izod strength, all as described above. In some embodiments, the composition has a combination of a coefficient of thermal expansion in the flow direction, specific volume resistivity, Notched Izod strength, all as described above. In some embodiments the composition has a combination of a coefficient of thermal expansion in the flow direction, specific volume resistivity, Notched Izod strength, and elongation at break, all as described above.

Poly(arylene ether) comprises repeating structural units of formula (I)

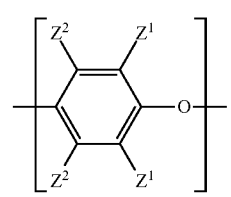

(I)

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

A portion of the poly(arylene ether) can be functionalized with a polyfunctional compound (functionalizing agent) as described below. The poly(arylene ether) can be functionalized prior to making the composition or can be functionalized as part of making the composition. Furthermore, prior to functionalization the poly(arylene ether) can be extruded, for example to be formed into pellets. It is also possible for the poly(arylene ether) to be melt mixed with other additives that do not interfere with functionalization.

The poly(arylene ether) can have a number average molecular weight of 3,000 to 40,000 grams per mole (g/mol) and/or a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are desired.

The composition comprises poly(arylene ether) in an amount of 5 to 50 weight percent. Within this range, the poly(arylene ether) may be present in an amount greater than or equal to 13 weight percent, or, more specifically, in an amount greater than or equal to 15 weight percent, or, even more specifically, in an amount greater than or equal to 17 weight percent. Also within this range the poly(arylene ether) may be present in an amount less than or equal to 40 weight percent, or, more specifically, less than or equal to 30 weight percent, or, even more specifically, less than or equal to 20 weight percent. Weight percent is based on the total weight of the thermoplastic composition.

Polyamide resins, also known as nylons, are characterized by the presence of an amide group (—C(O)NH—), and are described in U.S. Pat. No. 4,970,272. Exemplary polyamide resins include, but are not limited to, nylon-6; nylon-6,6; nylon-4; nylon-4,6; nylon-12; nylon-6,10; nylon 6,9; nylon-6,12; amorphous polyamide resins; nylon 6/6T and nylon 6,6/6T with triamine contents below 0.5 weight percent; and combinations of two or more of the foregoing polyamides. In some embodiments, the polyamide resin comprises nylon 6 and nylon 6,6. In some embodiments the polyamide resin or combination of polyamide resins has a melting point ($T_m$) greater than or equal to 171° C. When the polyamide comprises a super tough polyamide, i.e. a rubber-toughed polyamide, the composition may or may not contain a separate impact modifier.

Polyamide resins may be obtained by a number of well known processes such as those described in U.S. Pat. Nos. 2,071,250; 2,071,251; 2,130,523; 2,130,948; 2,241,322; 2,312,966; and 2,512,606. Polyamide resins are commercially available from a wide variety of sources.

Polyamide resins having an intrinsic viscosity of up to 400 milliliters per gram (ml/g) can be used, or, more specifically, having a viscosity of 90 to 350 ml/g, or, even more specifically, having a viscosity of 110 to 240 ml/g, as measured in a 0.5 wt % solution in 96 wt % sulfuric acid in accordance with ISO 307.

The polyamide may have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In some embodiments, the polyamide resin comprises a polyamide having an amine end group concentration greater than or equal to 35 microequivalents amine end group per gram of polyamide (μeq/g) as determined by titration with HCl. Within this range, the amine end group concentration may be greater than or equal to 40 μeq/g, or, more specifically, greater than or equal to 45 μeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

The composition comprises polyamide in an amount of 30 to 85 weight percent. Within this range, the polyamide may be present in an amount greater than or equal to 33 weight percent, or, more specifically, in an amount greater than or equal to 38 weight percent, or, even more specifically, in an amount greater than or equal to 40 weight percent. Also within this range, the polyamide may be present in an amount less than or equal to 60 weight percent, or, more specifically, less than or equal to 55 weight percent, or, even more specifically, less than or equal to 50 weight percent. Weight percent is based on the total weight of the thermoplastic composition.

When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expressions "compatibilized poly(arylene ether)" or "compatibilized poly(arylene ether)/polyamide blend" refers to those compositions which have been physically and/or chemically compatibilized with an agent as discussed above, as well as those compositions which are physically compatible without such agents, as taught in U.S. Pat. No. 3,379,792.

Examples of the various compatibilizing agents that maybe employed include: liquid diene polymers, epoxy compounds, oxidized polyolefin wax, quinones, organosilane compounds, polyfunctional compounds, functionalized poly(arylene ether) and combinations comprising at least one of the foregoing. Compatibilizing agents are further described in U.S. Pat. Nos. 5,132,365 and 6,593,411 as well as U.S. Patent Application No. 2003/0166762.

In some embodiments, the compatibilizing agent comprises a polyfunctional compound. Polyfunctional compounds which may be employed as a compatibilizing agent are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with $NH_2$ groups; functionalized diene polymers and copolymers; and combinations comprising one or more of the foregoing. In one embodiment, the compatibilizing agent comprises maleic anhydride and/or fumaric acid.

The second type of polyfunctional compatibilizing agents are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

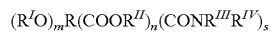

wherein R is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetyl-succinic acid, trimellitic acid chloride, and chloroacetyl glutaric acid. In one embodiment, the compatibilizing agent comprises trimellitic anhydride acid chloride.

The foregoing compatibilizing agents may be added directly to the melt blend or pre-reacted with either of the poly(arylene ether) and polyamide individually or in combination, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly(arylene ether). For example, the poly(arylene ether) may be pre-reacted with maleic anhydride to form an anhydride functionalized polyphenylene ether which has improved compatibility with the polyamide compared to a non-functionalized polyphenylene ether.

Where the compatibilizing agent is employed in the preparation of the compositions, the amount used will be dependent upon the specific compatibilizing agent chosen and the specific polymeric system to which it is added.

The composition further comprises electrically conductive filler. The electrically conductive filler may be any filler that increases the electrical conductivity of the molded composition. Suitable electrically conductive fillers may be fibrous, disc-shaped, spherical or amorphous and include, for example, conductive carbon black; conductive carbon fibers, including milled fibers; conductive vapor-grown carbon fibers, and various mixtures thereof. Other electrically conductive fillers which can be used are metal-coated carbon fibers; metal fibers; metal disks; metal particles; metal-coated disc-shaped fillers such as metal-coated talcs, micas and kaolins; and the like. In some embodiments the electrically conductive fillers include carbon black, carbon fibers, and mixtures thereof, an illustrative example of which includes material available commercially from Akzo Chemical under the trademark Ketjen black EC600JD. In some embodiments, carbon black includes conductive carbon blacks having average particle sizes of less than 200 nanometers, or, more specifically, less than 100 nanometers, or, even more specifically, less than 50 nanometers. Conductive carbon blacks may also have surface areas greater than 200 square meters per gram ($m^2/g$), or, more specifically, greater than 400 $m^2/g$, or, even more specifically greater than 1000 $m^2/g$. Conductive carbon blacks may also have a pore volume (as measured by dibutyl phthalate absorption) of greater than 40 cubic centimeters per 100 grams ($cm^3/100$ g), or, more specifically, greater than 100 $cm^3/100$ g, or, even more specifically, greater than 150 $cm^3/100$ g. Conductive carbon blacks may also have a volatiles content less than 2 weight percent. Useful carbon blacks include the graphitic or partially graphitic vapor-grown carbon fibers having diameters of 3.5 to 500 nanometers, or, more specifically, diameters of 3.5 to 70 nanometers, or, even more specifically, diameters of 3.5 to 50 nanometers. Representative carbon fibers are the vapor-grown carbon fibers, such as those available from Hyperion, and double wall and single wall nanotubes such as those available from Carbon Nanotechnologies Incorporated (CNI). Conductive fillers of this type are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the electrically conductive filler will be present in an amount of 0.2 weight percent to 20 weight percent based on the total weight of the composition. The amount will depend on the nature of the conductive filler. For example, when the conductive filler is conductive carbon black, the amount can be 1 to 10 weight percent, or, more specifically, 1 to 8 weight percent, or, even more specifically, 1.4 to 7 weight percent. When the conductive filler is a vapor-grown carbon fiber, the amount can be 0.2 to 6 weight percent, or, more specifically, 0.5 to 4 weight percent based on the total weight of the composition. Conductive filler amounts less than the above lower limits often fail to provide adequate conductivity, while amounts greater than the above upper limits may tend to make the final blend brittle.

The compositions may further comprise an impact modifier, which includes natural and synthetic polymer substances that are elastic bodies at room temperature. Impact modifiers can be block copolymers containing alkenyl aromatic repeating units, for example, A-B diblock copolymers and A-B-A triblock copolymers having of one or two alkenyl aromatic blocks A (blocks having alkenyl aromatic repeating units), which are typically styrene blocks, and a rubber block, B, which is typically an isoprene or butadiene block. The butadiene block may be partially or completely hydrogenated. Mixtures of these diblock and triblock copolymers may also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, Kraton Polymers, under the trademark KRATON, Dexco under the trademark VECTOR, Asahi Kasai under the trademark TUFTEC, Total Petrochemicals under the trademarks FINAPRENE and FINACLEAR and Kuraray under the trademark SEPTON.

In one embodiment, the impact modifier comprises polystyrene-poly(ethylene-butylene)-polystyrene, polystyrene-poly(ethylene-propylene) or a combination of the foregoing.

The aforementioned impact modifiers can be used singly or in combination.

The composition may comprise an impact modifier or a combination of impact modifiers, in an amount of 1 to 20 weight percent. Within this range, the impact modifier may be present in an amount greater than or equal to 1.5 weight percent, or, more specifically, in an amount greater than or equal to 2 weight percent, or, even more specifically, in an amount greater than or equal to 4 weight percent. Also within this range, the impact modifier may be present in an amount less than or equal to 18 weight percent, or, more specifically, less than or equal to 15 weight percent, or, even more specifically, less than or equal to 12 weight percent. Weight percent is based on the total weight of the thermoplastic composition.

As mentioned above the composition further comprises wollastonite. Wollastonites that may be used include both natural and synthetic wollastonite, in calcined or non-calcined state. Commercially available wollastonite is usually a mineral of natural calcium silicate ($CaSiO_3$) of acicular structure, with a theoretical composition of 48.3% CaO and 51.7% of SiO 2 by weight although impurities can be present. The wollastonite may optionally be surface-treated with a surface treatment agent such as a silane coupling agent (e.g., an alkoxysilane such as a glycidylalkoxysilane, an alkylalkoxysilane, or an aminosilane) or a titanate type coupling agent. The wollastonite has an average length to diameter ratio less than or equal to 5, or, more specifically less than or equal to 4, or, more specifically less than or equal to 3. The average length to diameter ratio is greater than or equal to 2. In some embodiments the wollastonite particles have no single linear dimension greater than 10 micrometers. Previously it has been believed that mineral filler average particle size has been essential to obtaining a desired physical property profile with a general trend toward smaller particle sizes. However, in the compositions described herein, a small particle size alone does not yield the desired physical property profile. As shown in the examples below the length to diameter ratio is an essential element for obtaining a composition with little or no warpage. In addition to the length to diameter ratio, useful wollastonites have a median particle size of 2 to 5 micrometers.

The composition comprises wollastonite in an amount of 5 to 50 weight percent. Within this range, the wollastonite may be present in an amount greater than or equal to 8 weight percent, or, more specifically, in an amount greater than or equal to 10 weight percent, or, even more specifically, in an amount greater than or equal to 15 weight percent. Also within this range the wollastonite may be present in an amount less than or equal to 40 weight percent, or, more specifically, less than or equal to 35 weight percent, or, even more specifically, less than or equal to 30 weight percent. Weight percent is based on the total weight of the thermoplastic composition.

The composition may also comprise additives known in the art. Possible include anti-oxidants, dyes, pigments, colorants, stabilizers, flame retardants, drip retardants, crystallization nucleators, metal salts, antistatic agents, plasticizers, lubricants, and combinations comprising two or more of the foregoing additives. These additives are known in the art, as are their effective levels and methods of incorporation. Effective amounts of the additives vary widely, but they are usually present in an amount of less than or equal to 50 weight percent, based on the total weight of the composition. Amounts of these additives are generally 0.25 weight percent to 2 weight percent, based upon the total weight of the composition. The effective amount can be determined by those skilled in the art without undue experimentation.

The composition can, optionally, exclude any polymer other than those taught herein as required or optional.

The composition can be prepared using various techniques, including batch or continuous techniques that employ kneaders, extruders, mixers, and the like. For example, the composition can be formed as a melt blend employing a twin-screw extruder. In some embodiments at least some of the components are added sequentially. For example, the poly(arylene ether), the impact modifier, and functionalizing agent may be added to the extruder at the feed throat or in feeding sections adjacent to the feed throat, while the polyamide, electrically conductive filler and wollastonite, may be added to the extruder in a subsequent feeding section downstream. When a functionalized poly(arylene ether) is used the functionalized poly(arylene ether) and impact modifier may be added to the extruder at the feed throat or in feeding sections adjacent to the feed throat, while the polyamide, electrically conductive filler and wollastonite may be added to the extruder in a subsequent feeding section downstream. A vacuum system may be applied to the extruder, prior to the second sequential addition, to generate a sufficient vacuum to lower the residual levels of non-reacted functionalizing agent and any other volatile materials. In an alternative embodiment, the sequential addition of the components may be accomplished through multiple extrusions. A composition may be made by preextrusion of selected components, such as the poly(arylene ether), the impact modifier and the functionalizing agent to produce a pelletized mixture. A second extrusion may then be employed to combine the preextruded components with the remaining components. The electrically conductive filler can be added as part of a masterbatch or directly. The masterbatch or the electrically conductive filler can be added either at the feedthroat or down stream. The extruder may be a two lobe or three lobe twin screw extruder.

In some embodiments, the poly(arylene ether), the impact modifier, and functionalizing agent are added to the extruder at the feed throat or in feeding sections adjacent to the feed throat, while the polyamide, electrically conductive filler and masterbatch comprising wollastonite and polyamide, are added to the extruder in a subsequent feeding section downstream. The electrically conductive filler may be added as part of a masterbatch.

The following non-limiting examples further illustrate the various embodiments described herein.

EXAMPLES

Composition. The following components and proportions, shown in Table 1, were used for the compositions prepared in each of the following examples.

TABLE 1

| Material Name | Material Description/Supplier |
|---|---|
| PPE I | A poly (2,6-dimethylphenylene ether) with an intrinsic viscosity of 0.40 dl/g as measured in chloroform at 25° C. commercially available from SABIC Innovative Plastics. |
| PPE II | A poly (2,6-dimethylphenylene ether) with an intrinsic viscosity of 0.46 dl/g as measured in chloroform at 25° C. commercially available from SABIC Innovative Plastics. |
| SEBS | Polystyrene-poly(ethylene-butylene)-polystyrene commercially available as KRATON 1651 from Kraton Polymers |
| SEP | Polystyrene-poly(ethylene-propylene)-polystyrene commercially available as KRATON 1701 from Kraton Polymers |
| NYGLOS 4 | Wollastonite having a median particle size of 4 micrometers, an average length to diameter ratio of 11:1 and commercially available from NYCO Minerals |
| NYAD 5000 | Wollastonite having a median particle size of 2 micrometers, an average length to diameter ratio of 3:1 and commercially available from NYCO |
| NYAD 7500 | Wollastonite having a median particle size of 1 micrometer, a length to diameter ratio of 3:1 and commercially available from NYCO Minerals |
| PA 66 | Polyamide 66 commercially available from Rhodia under the trade name Stabamid 24FE1. The polyamide had a viscosity according to ISO 307 of 126 milliliters per gram. |
| PA 6 | Polyamide 6 commercially available from Rhodia under the trade name Technyl ASN 27/32-35 LC Natural. The polyamide had a viscosity according to ISO 307 of 121 milliliters per gram. |
| CF-MB | A carbon fiber masterbatch containing 20 weight percent carbon fibers and 80 weight percent polyamide, based on the total weight of the CF-MB and available from Hyperion |
| CCB | Conductive carbon black commercially available from AKZO as KetjenBlack EC600JD |
| Talc-MB | A talc masterbatch containing 45 weight percent talc and 55 weight percent polyamide, based on the total weight of the talc-MB and available from Clariant |
| Clay-MB | A clay masterbatch containing 45 weight percent clay and 55 weight percent polyamide, based on the total weight of the clay-MB and available from LNP Italy |
| Citric Acid | |

Processing conditions. All examples were prepared by melt mixing using a 28 millimeter Werner and Pfleider twin screw extruder operating at a screw speed of 300 rotations per minute, with a feed rate of 10 kilograms per hour and a maximum temperature of 310° C. The processing conditions and additional information on the disposition of the barrels and the temperature zones for the extruder are given in Table 2. The PPE, impact modifier and citric acid were added at the feedthroat or in feeding sections adjacent to the feedthroat. The polyamide and wollastonite masterbatch, talc masterbatch or clay masterbatch were added down stream. The electrically conductive filler was added after the polyamide and filler masterbatch. When carbon fibers were added they were added as part of a masterbatch as described in Table 1.

TABLE 2

| Temp Profile: | Barrel | 0 | 1 | 2 | 3 | 4 | 5 | 6 | 7 | 8 | 9 | 10 | Die |
|---|---|---|---|---|---|---|---|---|---|---|---|---|---|
| | Temp ° C. | 60 | 280 | 300 | 300 | 300 | 290 | 300 | 300 | 300 | 300 | 300 | 310 |
| RPM: | 300 | | | | | | | | | | | | |
| Rate: Kg/hr | 10 | | | | | | | | | | | | |

The examples were tested for CTE in the flow and cross flow (x-flow) direction. Flow direction is defined as the direction in which the majority of the molten thermoplastic composition moves when injection molding the sample(s) employed in coefficient of thermal expansion testing. Cross flow direction is defined as forming a 90 degree angle with the flow direction. The coefficient of thermal expansion (CTE) was measured according to ISO 11359-2 with the use of a thermal mechanical analyzer (TMA). The testing specimens were made by injection molding and have a size of 9 millimeters (mm) ×9 mm×4 mm wherein each of the foregoing dimensions was plus or minus 1 mm. The testing specimens were annealed at a temperature 30° C. below the glass transition temperature of the poly(arylene ether) in the first heating cycle and the expansion was recorded in the second heating cycle. The CTE was determined over a temperature range of 23° C. to 60° C.

The examples were tested for Notched Izod in accordance with ISO 180/1A at 23° C. using specimens having dimensions of 80 mm×10 mm×4 mm. A 5.5 Joule (J) hammer weight was allowed to freely fall to break the clamped notched samples with the notch facing the hammer. Prior to testing the specimens were stored in polyethylene bags at room temperature for at least 24 hours. Impact strength values are the arithmetic mean of at least 5 samples.

The examples were also tested for elongation at break in accordance with ISO 527 (1997) at 23° C. Elongation at break values are the average of 5 samples.

Examples 1-12

Examples 1-12 were made using the components and amounts shown in Table 3. Amounts are in weight percent based on the total weight of the composition unless otherwise specified. In addition to the listed components these examples also contained 1.1 to 1.2 weight percent of stabilizers and antioxidants. The examples were tested for coefficient of thermal expansion as described above in the flow and cross flow directions. Results are shown below in Table 3. The units for CTE measurements in Table 3 are micrometers/meter/° C. The examples were also tested for notched Izod impact strength as described above and results are shown in Table 3. The units for Notched Izod impact strength are kilojoules per square meter (kJ/m$^2$). The examples were also tested for elongation at break as described above. Results are shown in Table 3. The units for elongation at break are %. The wollastonite was added as part of a masterbatch (MB) containing 45 weight percent wollastonite and 55 weight percent polyamide, based on the total weight of the wollastonite masterbatch.

TABLE 3

| | 1* | 2* | 3 | 4 | 5 | 6 | 7 | 8 | 9 | 10 | 11 | 12 |
|---|---|---|---|---|---|---|---|---|---|---|---|---|
| PPE I | 34.2 | 25.7 | 17.1 | 27.1 | 37.1 | 17.1 | 27.1 | 17.1 | 27.1 | 17.1 | 17.1 | 17.1 |
| SEBS | 8 | 5.5 | 8 | 8 | 8 | 8 | 8 | 8 | 8 | 8 | 8 | 8 |
| SEP | 7 | — | 2 | 2 | 2 | 2 | 2 | 2 | 2 | — | 2 | 4 |
| Citric Acid | 0.7 | 0.7 | 0.7 | 0.7 | 0.7 | 0.7 | 0.7 | 0.7 | 0.7 | 0.7 | 0.7 | 0.7 |
| NYGLOS 4 MB | — | 40 | — | — | — | — | — | — | — | — | — | — |
| NYAD 5000 MB | — | — | 66.2 | 44.1 | 22.0 | 66.2 | 44.1 | — | — | 55.6 | 55.6 | 55.6 |
| NYAD 7500 MB | — | — | — | — | — | — | — | 66.2 | 44.1 | — | — | — |
| PA 66 | 38 | 26 | — | 12.1 | 24.2 | — | 12.1 | — | 12.1 | 16.4 | 14.4 | 12.4 |
| PA 6 | 10 | — | — | — | — | — | — | — | — | — | — | — |
| CF-MB | — | — | 5.5 | 5.5 | 5.5 | 5.5 | 5.5 | 5.5 | 5.5 | — | — | — |
| CCB | 1.7 | 1.7 | — | — | — | — | — | — | — | 1.7 | 1.7 | 1.7 |
| Amount of filler resulting from MB addition | — | 18 | 29.8 | 19.9 | 10 | 29.8 | 19.9 | 29.8 | 19.9 | 25 | 25 | 25 |
| CTE Flow | 100 | 60 | 65 | 69 | 80 | 65 | 69 | 65 | 68 | 72 | 72 | 76 |
| CTE X-Flow | 100 | 80 | 65 | 69 | 80 | 65 | 69 | 65 | 68 | 82 | 79 | 82 |
| Izod Notched Impact 23° C. | 17 | 8 | 14 | 14 | 18 | 9 | 11 | 10 | 13 | 8 | 9 | 10 |
| Elongation at break | 30 | 9 | 20 | 25 | 30 | 10 | 20 | 30 | 25 | 15 | 20 | 23 |

*Comparative example

Example 1, a comparative example, shows that a poly (arylene ether)/polyamide blend, without mineral filler, has a CTE in both the flow and cross flow directions of 100 um/m/° C. Example 2, also a comparative example, shows that the CTE is reduced when a wollastonite having a L:D of 11:1 is added but the CTE in the flow direction is only 75% of the CTE in the cross flow direction, resulting in warpage. In contrast, Examples 3-12 show that a CTE can be reduced and similar CTE values can be obtained in the flow and cross flow directions when the poly(arylene ether)-polyamide composition comprises wollastonite having a L:D of 3:1.

Examples 13-15

Examples 13-15 were made using the components and amounts shown in Table 4. Amounts are in weight percent based on the total weight of the composition unless otherwise specified. In addition to the listed components these examples also contained up to 1.0 weight percent of stabilizers and antioxidants. The talc, clay and wollastonite were added as part of a masterbatch. The wollastonite masterbatch (MB) contained 45 weight percent wollastonite and 55 weight percent polyamide, based on the total weight of the wollastonite masterbatch. Table 4 also shows the amount of talc, clay or wollastonite in the composition that resulted from the addition of the masterbatch. The examples were tested for coefficient of thermal expansion (CTE), Notched Izod and elongation at break as described above. Results are shown below in Table 4. The units for CTE measurements in Table 4 are um/m/° C. The units for Notched Izod impact strength are kilojoules per square meter (kJ/m²). The unit for elongation at break is %.

TABLE 4

|  | 13* | 14 | 15* |
|---|---|---|---|
| PPE I | 25.9 | 25.9 | 25.9 |
| SEBS | 5.5 | 5.5 | 5.5 |
| Citric Acid | 0.7 | 0.7 | 0.7 |
| Talc-MB | 40 | — | — |
| Clay-MB | — | — | 40 |
| NYAD 5000 MB | — | 40 | — |
| PA 66 | 26 | 26 | 26 |
| CCB | 1.7 | 1.7 | 1.7 |
| Amount of filler resulting from MB addition | 18 | 18 | 18 |
| Izod Notched Impact Strength 23° C. | 5.4 | 8.4 | 7.8 |
| CTE flow | 60 | 70 | 75 |
| CTE X-flow | 75 | 73 | 78 |
| Elongation at break | 4.6 | 19.3 | 11.5 |

*Comparative example

Example 13 shows that compositions having talc as the mineral filler have a CTE in the flow direction which is 80% of the CTE in the cross flow direction and suffers from warpage. Example 15, which contains clay as a mineral filler, has a CTE in the flow direction which 90% of the CTE in the cross flow direction. However, the Notched Izod impact strength is less than 8 kJ/m² and the elongation at Break is substantially less than Example 14.

Examples 16-21

Examples 16-21 were made using the components and amounts shown in Table 5. Examples 16-21 are all comparative examples. The examples containing wollastonite are comparative because the L:D ratio of the wollastonite used is greater than 5. Amounts are in weight percent based on the total weight of the composition unless otherwise specified. In addition to the listed components these examples also contained up to 2.5 weight percent of stabilizers, antioxidants and additives. Table 4 also shows the amount of talc or wollastonite in the composition that resulted from the addition of the masterbatch. The examples were tested for coefficient of thermal expansion (CTE), Notched Izod and elongation at break as described above. Results are shown below in Table 5. The units for CTE measurements in Table 5 are um/m/° C. The units for Notched Izod impact strength are kilojoules per square meter (kJ/m²). The unit for elongation at break is %.

TABLE 5

|  | 16* | 17* | 18* | 19* | 20* | 21* |
|---|---|---|---|---|---|---|
| PPE II | 24 | 20 | 16 | 24 | 20 | 16 |
| SEBS | 6 | 5 | 4 | 6 | 5 | 4 |
| Citric Acid | 0.7 | 0.7 | 0.7 | 0.7 | 0.7 | 0.7 |
| CCB | 0.3 | 0.3 | 0.3 | 0.3 | 0.3 | 0.3 |
| Talc-MB | 43.1 | 53.1 | 63.1 | — | — | — |
| NYGLOS 4-MB | — | — | — | 43.1 | 53.1 | 63.1 |
| PA6 | 5 | 5 | 5 | 5 | 5 | 5 |
| PA 66 | 20.9 | 15.9 | 10.9 | 20.9 | 15.9 | 10.9 |
| Amount of talc resulting from MB addition | 19.1 | 23.6 | 28.0 | — | — | — |
| Amount of wollastonite resulting from MB addition | — | — | — | 19.1 | 23.6 | 28.0 |
| Izod Notched Impact Strength 23° C. | 4.9 | 4.9 | 4.5 | 7.6 | 6.2 | 6.1 |
| Elongation at break | 6.6 | 5.7 | 4.3 | 8.1 | 11.2 | 9.2 |
| CTE flow | 64 | 58 | 52 | 61 | 53 | 47 |
| CTE X-flow | 90 | 85 | 83 | 100 | 98 | 98 |

*Comparative example

The data in Table 5 demonstrates the difficulty in obtaining a notched Izod impact strength greater than or equal to 6 kiloJoules per square meter, an elongation at break greater than or equal to 15, and a CTE in the flow direction which is 85 to 100% of the CTE in the cross flow direction.

In the specification and the claims, reference is made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents are incorporated by reference herein.

We claim:

1. A composition comprising a poly(arylene ether), a polyamide, electrically conductive filler, an impact modifier, and wollastonite wherein the wollastonite particles have a median particle size of 2 to 5 micrometers, based on all wollastonite particles used to make the composition, and an average length to diameter ratio less than 5, based on all wollastonite particles used to make the composition.

2. The composition of claim 1 wherein the composition has a coefficient of thermal expansion in the flow direction that is 85-100% of the coefficient of thermal expansion in the crossflow direction.

3. The composition of claim 1, wherein the composition has a coefficient of thermal expansion in the flow direction that is less than or equal to 100 micrometers/meter/oC.

4. The composition of claim 1, wherein the composition has a Notched Izod impact strength of 6 to 20 kiloJoules per square meter.

5. The composition of claim 1, wherein the composition has an elongation at break of 15 to 35%.

6. The composition of claim 1, wherein the composition has a specific volume resistivity less than or equal to 106 ohm-cm.

7. The composition of claim 1, wherein the wollastonite particles have an average length to diameter ratio less than or equal to 4, based on all wollastonite particles used to make the composition.

8. The composition of claim 7, wherein the wollastonite particles have an average length to diameter ratio less than or equal to 3, based on all wollastonite particles used to make the composition.

9. The composition of claim 1, wherein the poly(arylene ether) is present in an amount of 15 to 40 weight percent, the polyamide is present in an amount of 30 to 85 weight percent, impact modifier is present in an amount of 1 to 15 weight percent, the wollastonite is present in an amount of 5 to 50 weight percent, and weight percent is based on the total weight of the composition.

10. The composition of claim 1, wherein the polyamide has a relative viscosity of up to 6.

11. An injection molded article comprising the composition of claim 1.

12. A composition comprising:
 15 to 40 weight percent of a poly(arylene ether);
 30 to 85 weight percent of a polyamide;
 0.2 to 20 weight percent of electrically conductive filler;
 1 to 20 weight percent of an impact modifier; and
 5 to 50 weight percent of wollastonite wherein the wollastonite particles have a median particle size of 2 to 5 micrometers, based on all wollastonite particles used to make the composition, and an average length to diameter ratio less than or equal to 3, based on all wollastonite particles used to make the composition, and weight percent is based on the total weight of the composition.

13. A composition comprising:
 15 to 40 weight percent of a poly(arylene ether);
 30 to 85 weight percent of a polyamide;
 0.2 to 20 weight percent of electrically conductive filler;
 1 to 20 weight percent of an impact modifier; and
 5 to 50 weight percent of wollastonite wherein the wollastonite particles have a median particle size of 2 to 5 micrometers, based on all wollastonite particles used to make the composition, and an average length to diameter ratio less than or equal to 3, based on all wollastonite particles used to make the composition, and weight percent is based on the total weight of the composition, the composition has a coefficient of thermal expansion in the flow direction that is less than or equal to 100 micrometers/meter/oC, the composition has a Notched Izod impact strength of 6 to 20 kiloJoules per square meter, the composition has an elongation at break of 15 to 35%, and the composition has a coefficient of thermal expansion in the flow direction that is 90 to 100% of the coefficient of thermal expansion in the crossflow direction.

14. An injection molded article comprising the composition of claim 13.

15. A method of making a composition comprising:
 melt blending a poly(arylene ether), an impact modifier, and functionalizing agent to form a first mixture;
 melt blending the first mixture with a polyamide, electrically conductive filler and a masterbatch comprising wollastonite and polyamide, wherein the wollastonite has a median particle size of 2 to 5 micrometers, based on all wollastonite particles used to make the composition, and an average length to diameter ratio less than 5, based on all wollastonite particles used to make the composition.

16. The method of claim 15, wherein the electrically conductive filler is part of a masterbatch.

17. The method of claim 15, wherein the wollastonite particles have an average length to diameter ratio less than or equal to 4, based on all wollastonite particles used to make the composition.

18. The method of any of claim 15, wherein the wollastonite particles have an average length to diameter ratio less than or equal to 3, based on all wollastonite particles used to make the composition.

19. The method of claim 15, wherein the poly(arylene ether) is present in an amount of 15 to 40 weight percent, the polyamide is present in an amount of 30 to 85 weight percent, impact modifier is present in an amount of 1 to 15 weight percent, the wollastonite is present in an amount of 5 to 50 weight percent, and weight percent is based on the total weight of the composition.

* * * * *